J. E. FEENEY.
CAR WHEEL FLANGE LUBRICATOR.
APPLICATION FILED MAY 1, 1909.

998,487.

Patented July 18, 1911.

2 SHEETS—SHEET 1.

WITNESSES
J. Brophy
E. B. Marshall

INVENTOR
James E. Feeney
BY Munn & Co.
ATTORNEYS

J. E. FEENEY.
CAR WHEEL FLANGE LUBRICATOR.
APPLICATION FILED MAY 1, 1909.
998,487.
Patented July 18, 1911.
2 SHEETS—SHEET 2.
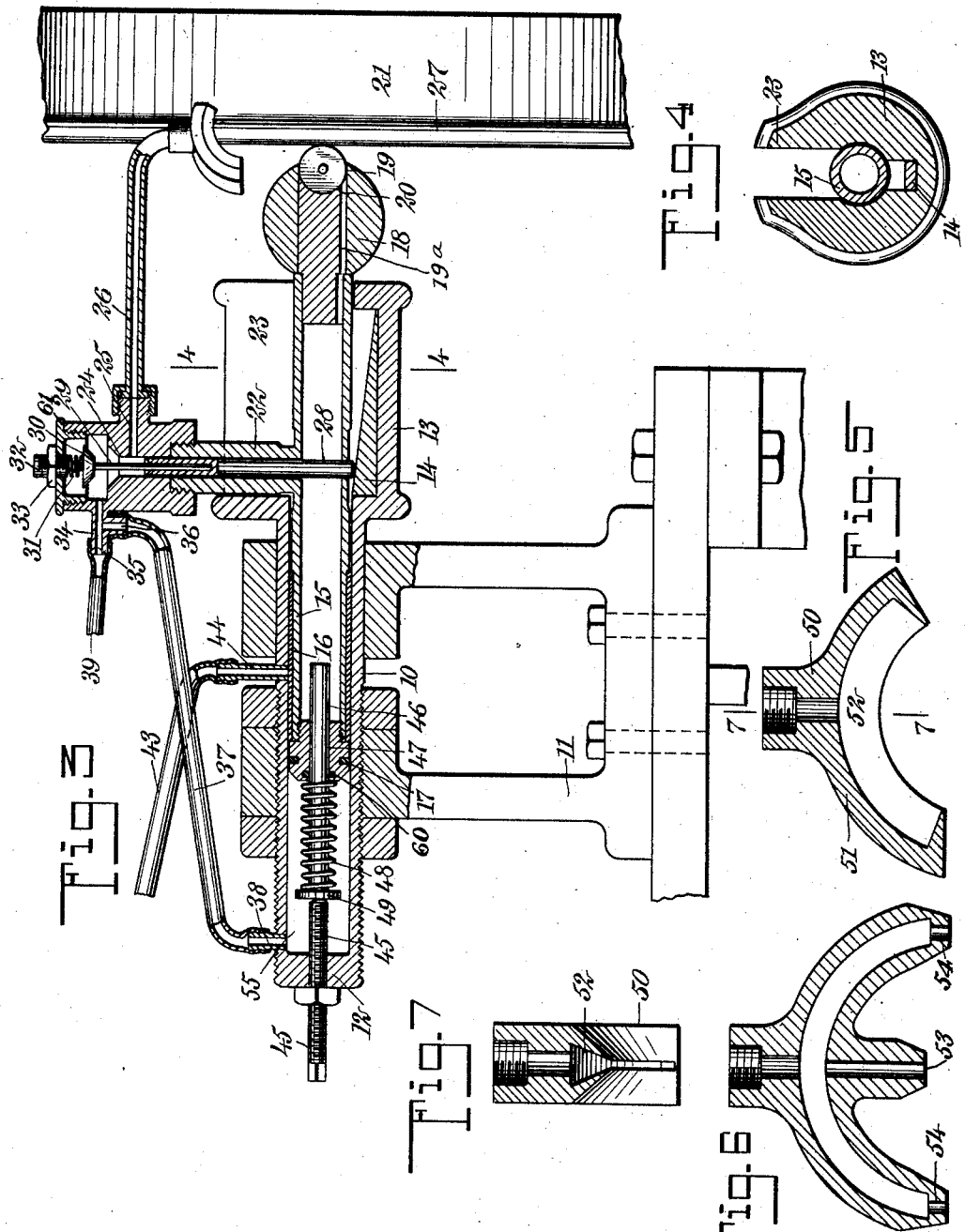
WITNESSES
INVENTOR
James E. Feeney
BY
ATTORNEYS

UNITED STATES PATENT OFFICE.

JAMES EDWARD FEENEY, OF MONTEREY, MEXICO.

CAR-WHEEL-FLANGE LUBRICATOR.

998,487. Specification of Letters Patent. Patented July 18, 1911.

Application filed May 1, 1909. Serial No. 493,246.

*To all whom it may concern:*

Be it known that I, JAMES E. FEENEY, a citizen of the United States, and a resident of Monterey, Mexico, have invented a new and Improved Car-Wheel-Flange Lubricator, of which the following is a full, clear, and exact description.

My invention relates to an automatic car wheel flange lubricator, and it has for its object to provide a device which will positively supply a lubricant to the flanges of car wheels when they are rounding curves, to prevent friction between the car wheel flanges and the rails, the lubricant being fed instantaneously when required, and in sufficient quantities to satisfy requirements.

Still other objects of the invention will appear in the following complete description.

In this specification I will describe the form of my invention shown in the accompanying drawings forming a part of this specification, the scope of the invention being defined in the appended claims.

Reference is to be had to the accompanying drawings, forming a part of this specification, in which similar characters of reference indicate corresponding parts in all the figures, in which—

Figure 1:
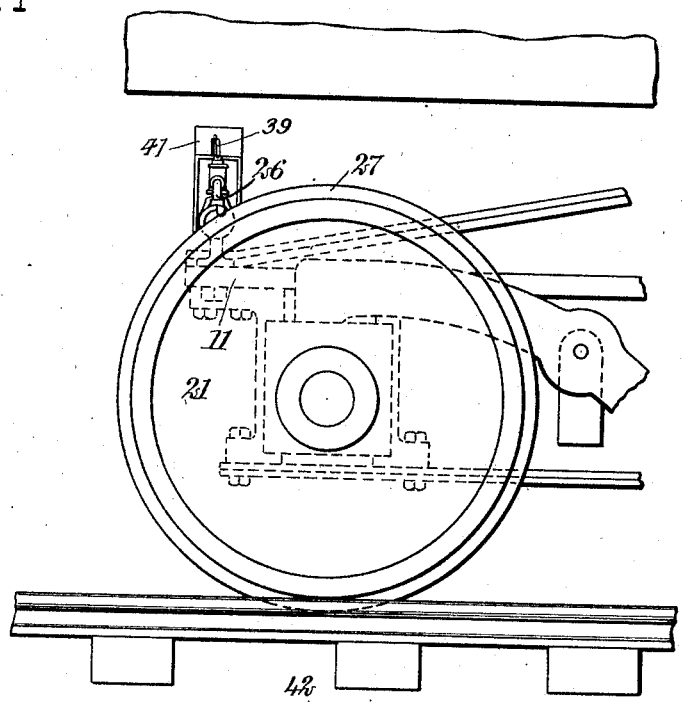
Figure 2:
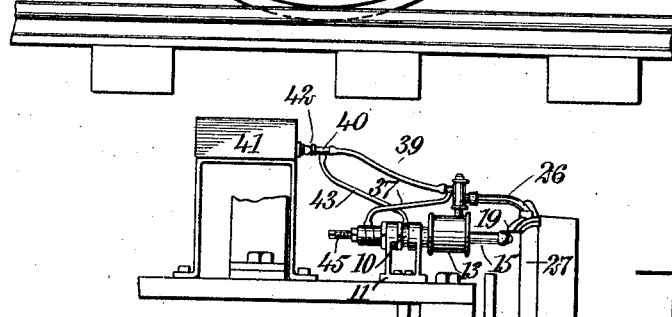
Figure 3:
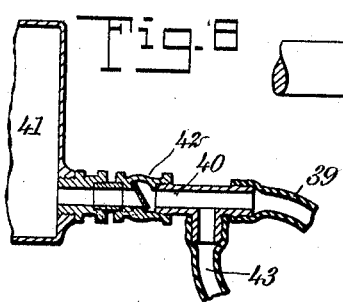

Figure 1 is a side elevation of a portion of a car truck showing my invention applied. Fig. 2 is a rear elevation of the same; Fig. 3 is an enlarged sectional view showing the parts of my invention; Fig. 4 is a sectional view on the line 4—4 of Fig. 3; Fig. 5 is a sectional view of one form of a nozzle which I use; Fig. 6 is a sectional view of another form of nozzle; Fig. 7 is a sectional view on the line 7—7 of Fig. 5; and Fig. 8 is an enlarged sectional view showing the connection of the pipes with the lubricator tank.

By referring to the drawings, it will be seen that a member 10, which is cylindrical in shape, is secured to the bracket 11, the said bracket being secured to the frame of the vehicle. This member 10 has an inner head 12 and a pocket 13 in which is disposed a wedge member 14. In the cylindrical member 10 is disposed a cylindrical member 15, packing members 16, 17 and 60, being provided to prevent any leakage from the rear of the cylindrical member 10. The cylindrical member 15 has a head 18, having a socket 20 in which is disposed a journaled roller 19; the roller 19 being normally disposed in close proximity to the car wheel 21. An oil outlet 19ª affords communication from the interior of the cylindrical member 15 to the journaled roller 19, by which it is lubricated, the lubricant being deposited in the said cylindrical member 15 for this purpose.

Secured to the cylindrical member 15 is a hollow standard 22, which is supported between the upper sides 23 of the pocket 13. To the hollow standard 22 is secured a valve seat 24, below which there is a conduit 25, with which a nozzle 26 communicates, the nozzle 26 having its free terminal disposed normally in close proximity to a flange 27 of the car wheel 21. In the hollow standard 22 is disposed a spindle 28, the lower terminal of which rests on the wedge member 14, this spindle 28 being secured to a valve 30 or engaging the stem 29 of the said valve, a spring 31 being disposed above the valve 30, which holds the valve 30 yieldingly on its seat 24. The tension of the spring 31 is adjusted by means of a screw 32, working in the cap 61 of the valve chamber for the valve 30 and a nut 33, there being a recess in the valve 30 in which the spring 31 is disposed, the said spring being confined by the said valve 30 and the said screw 32.

Above the valve seat 24, and at one side thereof, there is a conduit 34 having ports 35 and 36, a hose 37 being provided which connects the port 36 with an outlet and inlet double duty port 38 on the cylindrical member 10, disposed in close proximity to its head 12. A hose 39 connects the port 35 with a spout 40 on a lubricator tank 41. There is a check valve 42 in the spout 40. There is also provided a hose 43, which connects the spout 40 with an inlet 44 mounted on the cylindrical member 10 at a distance from its head 12. A rod 45 with a screw thread thereon meshes with a screw thread in the head 12, this rod 45 being adapted to contact with the rod 46 projecting through an inner head 47 of the cylindrical member 15 and a packing 60, a spring 48 being provided, which presses against a flange 49 on the rod 46 and also against the head 47, by which means the cylindical member 15 is held yieldingly extended in the cylindrical member 10.

In Figs. 5 and 7 of the drawings, I disclose a nozzle 50, having its free terminal in the shape of an arc 51, the inner sides 52 of the terminal 51 of the nozzle converging outwardly as best shown in Fig. 7. In Fig. 6 of the drawings I disclose another form of nozzle, which has a central outlet 53 and lateral outlets 54. When either of these nozzles, shown in Figs. 5, 6 and 7 of the drawings, are employed, they are so disposed that they will span the flange 27 of the car wheel 21. When the nozzle shown in Fig. 5 is used, it will be understood that the lubricant will flow in even quantities on the top and both sides of the flange 27, while, when the nozzle shown in Fig. 6 of drawings is used, it will feed the lubricant through the central outlet 53 and the lateral outlets 54.

It will be understood that my invention may be secured to frame members of the vehicle disposed at either side of the wheels and that the device may be secured to the frame at any suitable place to obtain wheel contact.

In using my invention, when the several parts are mounted as has been described, and when a locomotive or car is rounding a curve, the forward end of the truck will be thrown toward the front of the car wheel on the outer side of the curve, and as the roller 19 contacts with the car wheel 21, it will push the cylindrical member 15 within the cylindrical member 10 and against the pressure of the spring 48, moving with it the hollow standard 22 and the spindle 28, the spindle 28 riding upwardly on the wedge member 14, thereby lifting the valve 30 from its seat 24, and permitting the lubricant to flow through the conduit 25 and the nozzle 26 to the flange 27 of the car wheel; during this movement the admission port 44 is closed by a surface of the cylindrical member 15. At the same time, the lubricant which has collected in the rear end 55 of the cylindrical member 10 is forced through the hose 37 toward the conduit 34 and the valve, which insures a sufficient and instantaneous supply of the lubricant to be fed to the car wheel flange. When the lubricator is in an inoperative position, the lubricant accumulates in the rear end 55 of the cylindrical member 10, the lubricant flowing principally through the hose 43 but also through the hose 37, which is fed by the hose 39.

Having thus described my invention, I claim as new and desire to secure by Letters Patent:

1. In a car wheel flange lubricator, a nozzle having its free terminal in the shape of an arc, with its inner sides converging outwardly, adapted to span the flange of a car wheel, means for feeding a lubricant to the nozzle, and means which are adapted for throwing the said means into an operative position by contact with a car wheel.

2. In a car wheel flange lubricator, in combination with a car wheel, a nozzle having its free terminal in the shape of an arc, with its inner sides converging outwardly, disposed to feed a lubricant to the flange of the car wheel, means for feeding the nozzle with the lubricant, and a valve in the said means.

3. In a car wheel flange lubricator, a nozzle adapted to feed a lubricant to a car wheel, a communicating means for supplying the nozzle with a lubricant, a head for forcing the lubricant through the communicating means, and means adapted for operating the head by contact with a car wheel.

4. In a car wheel flange lubricator, a nozzle for supplying a car wheel with a lubricant adapted to be moved laterally relatively to the car wheel, and a member having a projection to which the nozzle is secured for engaging the car wheel to shift the nozzle so that it will at all times be in position relatively to the said car wheel.

5. In a car wheel flange lubricator, a truck having an axle and wheels, a nozzle mounted on the truck having a terminal disposed above and across the vertical plane of one of the wheels, there being an opening in the terminal which extends across the said plane, a communicating means adapted for supplying the nozzle with a lubricant, a valve in the said communicating means, means adapted for lifting the valve from its seat, and means mounted on the truck adapted for contacting with the car wheel for operating the second-mentioned means.

6. In a car wheel flange lubricator, a car wheel, a nozzle disposed to feed a lubricant to the car wheel, a communicating means for supplying the nozzle with a lubricant, a valve commanding the communicating means, a cylinder in communication with the communicating means, a head for forcing a fluid in the cylinder, and means adapted for operating the valve and the head by contact with the car wheel.

7. In a car wheel flange lubricator, a car wheel, two members which are adapted to have a sliding engagement with each other, a nozzle disposed to feed a lubricant to the flange of the car wheel, a conduit to supply a lubricant to the nozzle, a valve mounted on one of the members which is adapted for controlling the supply of the lubricant through the conduit, and a spindle which commands the valve, the spindle engaging a surface of varying height on the other member.

8. In a car wheel flange lubricator, two members which are adapted to have a sliding engagement with each other, a nozzle disposed to feed a lubricant to the flange of a car wheel, a conduit adapted for supplying a lubricant to the nozzle, a valve mounted on one of the members, which is adapted for controlling the supply of the lubricant through the conduit, and a spindle which commands the valve, the spindle engaging a surface of varying height on the other member, one of the members having a surface which is adapted for contacting with a car wheel.

9. In a car wheel flange lubricator, two members which are adapted to have a sliding engagement with each other, a nozzle disposed to feed a lubricant to the flange of a car wheel, a conduit adapted for supplying a lubricant to the nozzle, a valve mounted on one of the members, which is adapted for controlling the supply of the lubricant through the conduit, a spindle which commands the valve, the spindle engaging a surface of varying height on the other member, and a bearing roller on one of the members adapted to contact with the car wheel.

10. In a car wheel flange lubricator, a car wheel, two members which are adapted to have a sliding engagement with each other, means for holding the two members yieldingly in a predetermined position relatively to each other, a nozzle disposed to feed a lubricant to the flange of the car wheel, a conduit adapted for supplying a lubricant to the nozzle, a valve mounted on one of the members which is adapted for controlling the supply of the lubricant through the conduit, means for keeping the valve yieldingly closed, and a spindle which commands the valve, the spindle engaging a surface of varying height on the other member.

11. In a car wheel flange lubricator, a car wheel, a member having a cylinder, a second member with a cylinder disposed within the first named cylinder, inner heads on each of the cylinders, means for keeping the inner cylinder yieldingly extended, a terminal of the second member being disposed in close proximity to the car wheel, a nozzle disposed to feed a lubricant to the flange of the car wheel, a conduit which is adapted for supplying the nozzle with a lubricant, and a valve on the second member commanding the conduit, the stem of the valve engaging a surface of varying height on the first member.

12. In a car wheel flange lubricator, a car wheel, a member having a cylinder, a second member with a cylinder disposed within the first named cylinder, inner heads on each of the cylinders, means for keeping the other cylinder yieldingly extended, a terminal of the second member being disposed in close proximity to the car wheel, a nozzle disposed for feeding a lubricant to the flange of the car wheel, a conduit which is adapted for supplying the nozzle with a lubricant, a valve on the second member commanding the conduit, the stem of the valve engaging a surface of varying height on the first member, and means for holding the valve yieldingly closed.

13. In a car wheel flange lubricator, a car wheel, a member having a cylinder, a second member with a cylinder disposed within the first named cylinder, inner heads on each of the cylinders, means for keeping the inner cylinder yieldingly extended, a terminal of the second member being disposed in close proximity to the car wheel, a nozzle disposed to feed a lubricant to the flange of the car wheel, a conduit which is adapted for supplying the nozzle with a lubricant, a valve on the second member commanding the conduit, the stem of the valve engaging a surface of varying height on the first member, a tank for supplying the lubricant, and a pipe connecting the tank with the conduit.

14. In a car wheel flange lubricator, a car wheel, a member having a cylinder, a second member with a cylinder disposed within the first named cylinder, inner heads on each of the cylinders, means for keeping the inner cylinder yieldingly extended, a terminal of the second member being disposed in close proximity to the car wheel, a nozzle disposed to feed a lubricant to the flange of the car wheel, a conduit which is adapted for supplying the nozzle with a lubricant, a valve on the second member commanding the conduit, the stem of the valve engaging a surface of varying height on the first member, a tank for supplying the lubricant, a pipe connecting the tank with the conduit, and a second pipe connecting the conduit with the rear of the cylinder on the first member.

15. In a car wheel flange lubricator, a car wheel, a member having a cylinder, a second member with a cylinder disposed within the first named cylinder, inner heads on each of the cylinders, means for keeping the inner cylinder yieldingly extended, a terminal of the second member being disposed in close proximity to the car wheel, a nozzle disposed to feed a lubricant to the flange of the car wheel, a conduit which is adapted for supplying the nozzle with a lubricant, a valve on the second member commanding the conduit, the stem of the valve engaging a surface of varying height on the first member, a tank for supplying the lubricant, a pipe connecting the tank with the conduit, and a second pipe connecting the tank with the cylinder on the first member at a distance from its inner head.

16. In a car wheel flange lubricator, a car wheel, a member having a cylinder, a second member with a cylinder disposed within the first named cylinder, inner heads on each of the cylinders, means for keeping the inner cylinder yieldingly extended, a terminal of the second member being disposed in close proximity to the car wheel, a nozzle disposed to feed a lubricant to the flange of the car wheel, a conduit which is adapted for supplying the nozzle with a lubricant, a valve on the second member commanding the conduit, the stem of the valve engaging a surface of varying height on the first member, a tank for supplying the lubricant, a pipe connecting the tank with the conduit, a second pipe connecting the conduit with the rear of the cylinder on the first member, and a third pipe connecting the tank with the cylinder on the first member at a distance from its head.

17. In a car wheel flange lubricator, a car wheel, a member having a cylinder, a second member with a cylinder disposed within the first named cylinder, inner heads on each of the cylinders, means for keeping the inner cylinder yieldingly extended, a terminal of the second member being disposed in close proximity to the car wheel, a roller on the said terminal, a nozzle disposed to feed a lubricant to the flange of the car wheel, a conduit which is adapted for supplying the nozzle with a lubricant, a valve on the second member commanding the conduit, the stem of the valve engaging a surface of varying height on the first member, means for holding the valve yieldingly in one position, a tank for supplying the lubricant, a pipe connecting the tank with the conduit, a second pipe connecting the conduit with the rear of the cylinder on the first member, and a third pipe connecting the tank with the cylinder of the first member at a distance from its rear.

18. In a car wheel flange lubricator, a car wheel, a member having a cylinder, a second member with a cylinder disposed within the first-named cylinder, heads on one set of terminals of the cylinders, means for keeping the inner cylinder yieldingly extended, a nozzle disposed to feed a lubricant to the flange of the car wheel, a conduit which is adapted for supplying the nozzle with the lubricant, a valve commanding the conduit, automatic means for operating the valve, a tank for supplying the lubricant, a pipe connecting the tank with the conduit, and a second pipe connecting the conduit with the cylinder of the first member near its head.

19. In a car wheel flange lubricator, a car wheel, a member having a cylinder, a second member with a cylinder disposed within the first-named cylinder, heads on one set of terminals of the cylinders, a nozzle disposed to feed a lubricant to the flange of the car wheel, a conduit which is adapted for supplying the nozzle with the lubricant, a valve commanding the conduit, automatic means for operating the valve, a tank for supplying the lubricant, a pipe connecting the tank with the conduit, and a second pipe connecting the tank with the cylinder of the first member at a distance from its head.

20. In a car wheel flange lubricator, a member having a cylinder, a second member with a cylinder disposed within the first-named cylinder, heads at one set of terminals of the cylinders, a nozzle disposed to feed a lubricant to the flange of the car wheel, a conduit which is adapted to supply the nozzle with the lubricant, a valve commanding the conduit, automatic means for operating the valve, a tank for supplying the lubricant, a pipe connecting the tank with the conduit, a second pipe connecting the conduit with the cylinder of the first-named member near its head, and a third pipe connecting the tank with the cylinder of the first member at a distance from its head.

21. In a car wheel flange lubricator, a member having a cylinder, a second member with a cylinder disposed within the first-named cylinder, heads on one set of terminals of the cylinders, means for keeping the inner cylinder yieldingly extended, a nozzle adapted to feed a lubricant to the flange of the car wheel, a conduit which is adapted for supplying the nozzle with the lubricant, a valve commanding the conduit, means engaging a surface of varying height on the first member which are adapted to operate the valve, a tank for supplying the lubricant, a pipe connecting the tank with the conduit, a second pipe connecting the conduit with the cylinder of the first-named member near its head, and a third pipe connecting the tank with the cylinder of the first member at a distance from its head.

22. In a car wheel flange lubricator, a nozzle for feeding a lubricant to a car wheel, a member, a second member to which the nozzle is secured, having a projection for engaging a car wheel and adapted to be moved laterally relatively to the first member, the nozzle being adapted to be shifted into position relatively to the car wheel by the second-mentioned member, a communicating means leading to the nozzle, a valve commanding the communicating means, and means actuated by the movement of the members relatively to each other for operating the valve.

23. In a car wheel flange lubricator, in combination with a car wheel, a nozzle for feeding a lubricant to the car wheel, a member, a second member on which the nozzle is mounted, having a projection for engaging the car wheel, supported by the first member and adapted to be moved laterally relatively thereto, the nozzle being adapted to be shifted into position relatively to the car wheel by the second member, a communicating means leading to the nozzle, a valve commanding the communicating means, and means actuated by the movement of the members relatively to each other, for operating the valve.

24. In a car wheel flange lubricator, a communicating means, a head for forcing a lubricant through the communicating means, means for operating the head by contact with a car wheel, and a nozzle mounted on the last-mentioned means, to be carried therewith and in communication with the communicating means, for feeding a lubricant to the car wheel.

In testimony whereof I have signed my name to this specification in the presence of two subscribing witnesses.

JAMES EDWARD FEENEY.

Witnesses:
C. P. BEZANSON,
ENRIQUE C. CASTELLANOS.

Copies of this patent may be obtained for five cents each, by addressing the "Commissioner of Patents, Washington, D. C."